(12) United States Patent
Qiu et al.

(10) Patent No.: US 8,041,823 B2
(45) Date of Patent: Oct. 18, 2011

(54) OPTIMIZATION OF MEDIA FLOWS IN A TELECOMMUNICATIONS SYSTEM

(75) Inventors: Chaoxin Qiu, Austin, TX (US); Arshad Khan, Austin, TX (US); Jeffrey L. Scruggs, Round Rock, TX (US); Robert F. Dailey, Austin, TX (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 343 days.

(21) Appl. No.: 12/342,514

(22) Filed: Dec. 23, 2008

(65) Prior Publication Data

US 2010/0161806 A1    Jun. 24, 2010

(51) Int. Cl.
G06F 15/16    (2006.01)

(52) U.S. Cl. .................. 709/227; 709/217; 709/224

(58) Field of Classification Search .............. 709/230, 709/227, 231, 223, 224, 217; 370/356
See application file for complete search history.

(56) References Cited

U.S. PATENT DOCUMENTS

| | | | |
|---|---|---|---|
| 7,649,848 B1 | 1/2010 | Swan et al. | |
| 2002/0133611 A1* | 9/2002 | Gorsuch et al. | 709/231 |
| 2003/0051037 A1* | 3/2003 | Sundaram et al. | 709/227 |
| 2005/0138165 A1* | 6/2005 | Tang et al. | 709/224 |
| 2005/0138193 A1* | 6/2005 | Encarnacion et al. | 709/230 |
| 2005/0278439 A1* | 12/2005 | Cherkasova | 709/223 |
| 2006/0239257 A1* | 10/2006 | Banner et al. | 370/356 |
| 2007/0024705 A1 | 2/2007 | Richter et al. | |
| 2007/0211715 A1 | 9/2007 | Khouderchah et al. | |
| 2007/0220163 A1 | 9/2007 | Khouderchah et al. | |
| 2008/0298362 A1 | 12/2008 | Ben-Dvora et al. | |

* cited by examiner

Primary Examiner — Jungwon Chang
(74) Attorney, Agent, or Firm — Ed Guntin; Guntin Meles & Gust, PLC (57) ABSTRACT

Disclosed are techniques for optimization of media flows within a provider network. The provider network comprises a plurality of sites, each site having one or more media servers capable of supporting a media session with a user endpoint device. The provider network further includes a media server director (MSD) that receives registration information identifying one or more user endpoint devices that have registered with a particular site. Using this registration information, as well as predetermined preference policies, the MSD prepares a preference order for the media servers of the provider network for user endpoint devices associated with the site. When an application server signals an intent to establish a media session with a user endpoint device of the site, the MSD selects a media server based on the preference order and provides an indicator of the selected media server. The application server can then contact the selected media server identified by the indicator to establish and support a media session with the user endpoint device.

21 Claims, 6 Drawing Sheets

OPTIMIZATION OF MEDIA FLOWS IN A TELECOMMUNICATIONS SYSTEM

FIELD OF THE DISCLOSURE

The present disclosure generally relates to the provision of multimedia content, and more particularly, to the provision of multimedia content via a network.

BACKGROUND

Modern telecommunication systems, such as Next Generation Networks (NGNs), provide many media-rich services for mass markets. To provide these services, these networks implement media servers to source multimedia content from a provider network to user endpoint devices. Thus, the scalability of the telecommunication system is highly dependent on efficient media flows between the media servers and the corresponding user endpoint devices. However, conventional telecommunication systems often take an ad hoc approach to establishing media sessions between a user endpoint device and a media server. This approach often can lead to a media flow unnecessarily traversing a given network link within the provider network two or more times between the media server and the user endpoint device. This backtracking, or "hairpin", in the media flow within the provider network has a significant dampening effect on media flows and thus limits scalability of the telecommunication system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

FIGS. 1-6 illustrate example techniques for optimization of media flows within a provider network. In at least one embodiment, the provider network comprises a plurality of sites, each site having one or more media servers capable of supporting a media session with a user endpoint device. The provider network further includes a media server director (MSD) that receives registration information identifying the one or more user endpoint devices that have registered with a particular site of the plurality sites. Using this registration information, as well as preference policies set by a network operator or other entity, the MSD prepares a preference order for the media servers of the provider network with respect to supporting media sessions with the user endpoint devices registered with the particular site. The preference policies include, for example, prioritization of media servers located at the same site over media servers at different sites, prioritization of media servers with a lighter workload over media servers with a heavier workload, prioritization of media servers that would require utilization of a network link with a lighter loading over media servers that would require utilization of a network link with a heavier loading, or a combination thereof. When an application server (or other component) of the provider network signals an intent to establish a media session with a user endpoint device of the site, the MSD selects a media server based on the preference order and provides the application server with an indicator of the selected media server. The application server can then contact the selected media server identified by the indicator and use the selected media server to establish and support a media session with the user endpoint device.

The term "user endpoint device" refers to a user device that processes multimedia content for presentation to a user, processes multimedia content for transmission to another component of the network (such as a component of the provider network, another user endpoint device), or a combination thereof. Examples of user endpoint devices include, but are not limited to, set top boxes (STBs), cable modems, digital subscriber line (DSL) modems, fiber optic modems, networked personal computers, networked personal digital assistants (PDAs), data-enabled cellular phones, WiFi (IEEE 802.11) routers, and the like. In at least one embodiment, the user endpoint device particularly includes or implements a Session Initiation Protocol (SIP) user agent or other similar agent, such as a soft phone implemented in a personal computer, an Internet Protocol (IP) phone, an ATA device (e.g., stand alone or built in modems or WiFi routers), 3G or 2.5G wireless devices with an IP Multimedia Subsystem (IMS)-compliant device built-in.

For ease of discussion, the techniques of the present disclosure are illustrated in the example context of a Next Generation Network (NGN) comprising one or more packet-based network architectures (e.g., the Internet, a private Internet Protocol (IP)-based network, etc.) utilized to convey multimedia content between user endpoint devices, content sources, media servers, and other components of the network. However, these techniques are not limited to this example contents, but instead can be implemented in any of a variety of packet-based networks configured to support the transmission of multimedia content using the guidelines provided herein without departing from the scope of the present disclosure. Likewise, the techniques of the present disclosure are described with reference to a single user endpoint device. However, it will be appreciated that a telecommunications network may support a number of user endpoint devices and thus the described techniques can be employed in parallel for some or all of the user endpoint devices within the telecommunications network.

Figure 1:
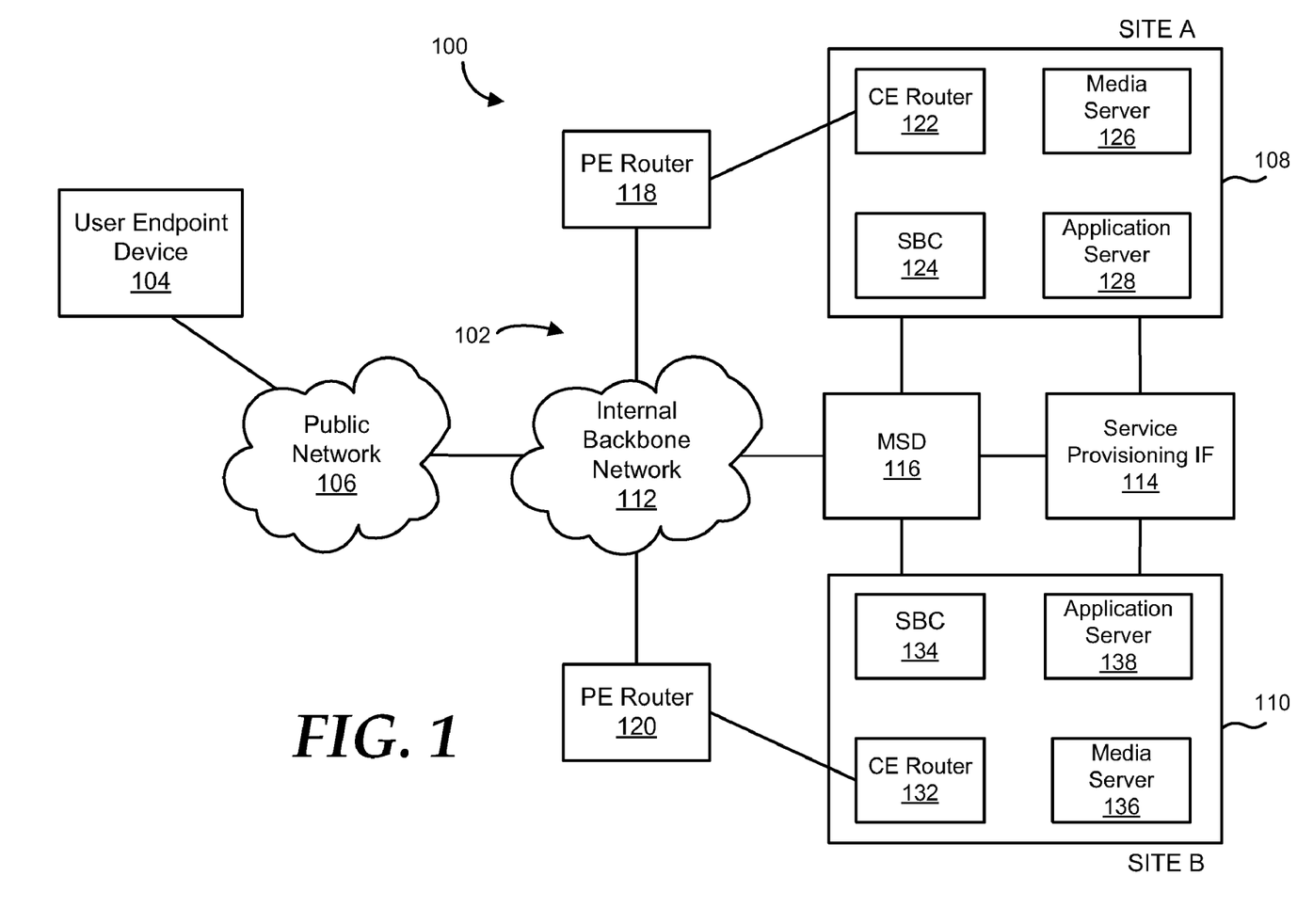
FIG. 1 is a diagram illustrating an example telecommunication system utilizing enhanced media server assignment for media flows in accordance with at least one embodiment of the present disclosure.

FIG. 1 illustrates a telecommunication system 100 for conveying multimedia content to and from one or more user endpoint devices in accordance with at least one embodiment of the present disclosure. The telecommunication system 100 includes a provider network 102, one or more user endpoint devices (e.g., user endpoint device 104), and a linking network 106 used to establish a network connection between the user endpoint device 104 and the provider network 102. In FIG. 1, the linking network 106 is illustrated as a public network, such as the Internet or other publically-accessible packet-based network. However, in other embodiments, the linking network 106 can be implemented as a private network, such as a private IP-based network (e.g., a private local area network).

The provider network 102 includes a plurality of sites (e.g., sites 108 and 110), an internal backbone network 112, a provisioning interface 114 to a service provisioning system (not shown), and a media server director (MSD) 116. Further, the provider network 102 can include, for example, a provider edge (PE) router 118 to facilitate routing of communications between the site 108 and the internal backbone network 112 and a PE router 120 to facilitate routing of communications between the site 110 and the internal backbone network 112. The internal backbone network 112 can include any of a variety of packet-based networks separately maintained by a service provider, such as a private Ethernet-based network, a satellite network, a cellular network, a fiber optic network, or combinations thereof.

Each of the plurality of sites includes a customer edge (CE) router and a session border controller (SBC). Some or all of the sites also can include one or more application servers and one or more media servers. In FIG. 1, the site 108 includes a CE router 122, an SBC 124, a media server 126, and an application server 128, and the site 110 includes a CE router 132, an SBC 134, a media server 136, and an application server 138. The SBC of a site can act as an application-level firewall to secure access to the site with respect to external components, such as the user endpoint device 104, another component on the public network 106, or another component on the internal backbone network 112 (e.g., another site). The SBC can perform network address translation (NAT) between the local network connecting the other components of the site and the components external to the site. Further, as described in greater detail below, user endpoint devices assigned to a site register with the SBC of the site to gain access to the services provided by the provider network. The media server of a site receives, stores, and provides multimedia content as directed by other components of the provider network 102. In at least one embodiment, the provider network 102 supports telephony via VoIP and MoIP and thus the multimedia can include ringback tone data, voice data (generated via, e.g., a VoIP session), multimedia messaging service data, and the like.

The application servers are configured to provide one or more service features, or applications, to associated user endpoint devices or other components of the provider network 102. To illustrate, an application server can be configured to support VoIP telephony, MoIP transmissions, ringback functions, ad hoc teleconferences, multimedia messaging services, and the like. In implementing these services, the application server is configured to establish a media session between the user endpoint device implementing the application and a selected media server that acts to receive, store, or provide the multimedia content associated with the media session. The application server can establish the media session via, for example, the Session Initiation Protocol (SIP). Further, although FIG. 1 illustrates each site 108 and 110 as having an application server, in certain implementations not all sites of a provider network 102 may be deployed with an application server. In such instances, the application servers and other call processing components can be implemented at, for example, more concentrated server offices, together with, or separate from, the MSD 116.

Each site of the plurality of sites of the provider network 102 is defined by network proximity, geographic proximity, or a combination thereof. To illustrate, the CE router 122, the SBC 124, the media server 126, and the application server 128 are considered to be "located" at the same site 108 because communications between these components are facilitated by one or more local networks or buses (not shown) without requiring the communications to traverse the internal backbone network 112. Likewise, the CE router 132, the SBC 134, the media server 136, and the application server 138 are considered to be "located" at the same site 110 because communication between these components are facilitated by one or more local networks or buses (not shown) without requiring communications to traverse the internal backbone network 112. Thus, a component is "located" at a site by virtue of the relatively few/minor network links or network latency needed to effect communications between the component and other components of the site, whereas two components connected by the internal backbone network 112 may not be considered to be "located" at the same site due to the substantial network link/latency imposed by the internal backbone network 112. Thus, while the sites can be geographically remote, the sites also can be physically close to each other, such as in the same building, the same server room, or even the same server rack. However, the techniques of the present disclosure are described below in an example context whereby the sites of the provider network are geographically separated as central offices (COs) distributed in different cities or geographical regions for ease of illustration.

The provisioning interface 114 interfaces to one or more service provisioning systems that, in one embodiment, stores user profile information and device profile information, and collects other information so as to facilitate an appropriate service or application for the needs of the user endpoint devices. These service provisioning systems, together with systems for accounting/billing processes, service order processes, security managements, fault managements, and network system configuration management, etc. are generally referred to as network service provider's operational system systems (OSS). Generally, the service provisioning system is responsible for providing subscriber service data into the network call processing components, including application servers, media servers, and other components, such as IMS components, Home Subscriber System (HSS) components, Call Session Control Function (CSCF) components, Media Gateway Control Function (MGCF) components (not shown), and the like. The provider network 102 may include more than one service provisioning system, such as one each for a particular service or a particular set of services. For example, there may be a service provisioning system for providing subscriber profiles to IMS call processing components and another service provisioning system for providing subscriber data for music ring tone service.

The MSD 116 is coupled to each of the plurality of the sites within the provider network 102. The MSD 116 can be coupled to a site via the internal backbone network 112, via a separate direct link to the site, or a combination thereof. Although FIG. 1 illustrates an embodiment of the MSD 116 as a single server, in alternate embodiments the MSD 116 can be implemented as a collection of servers at one or more sites within the provider network 102. In this distributed implementation, these servers share a single image of data either by replicating all data locally in each server or by storing the data in a network storage server and caching the data locally in each server.

As described in greater detail herein, the MSD 116 is configured to receive registration information from the SBCs of the plurality of sites of the provider network 102 so as to determine which user endpoint devices are registered with which sites. The MSD 116 further can receive loading information from the one or more media servers at each site and loading information from one or more network links within the provider network 102 (e.g., the PE-CE links between the PE routers 118, 120 and the CE routers 122, 132). Moreover, the MSD 116 can receive data representative of preference policies from a network operator via a provisioning interface 114, which can be implemented by using web GUI, other graphical user interface (GUI), or a command line interface. Based on these preference policies, the MSD 116 can determine a preference order of media servers in the provider network 102 for a given site (e.g., for a given SBC at the site) so as to support media flows with the user endpoint devices registered with the given sit. The preference policies can give preference to media servers located at the same site at which the SBC is located over media servers located at other sites, give preference to media servers having a lower workload over media servers having a higher workload, give preference to media servers requiring traversal of less loaded network links over media servers requiring traversal of more loaded network links, or a combination thereof. In the event that an application server intends to establish a media session with the user endpoint device registered with a particular site (e.g., to establish a VoIP call for the user endpoint device), the MSD 116 selects a media server of the provider network 102 based on the preference order for the corresponding SBC of the site and provides an indicator of the selected media server to the application server. The application server then can establish the media session between the user endpoint device and the media server identified by the MSD 116.

Further, the MSD 116 can signal the provisioning of multimedia data for storage at the selected media server before any media sessions are established. To illustrate, the provider network 102 could provide a networked digital video recorder (DVR) service for the user endpoint device 104 and thus when the user endpoint device 104 registers with the SBC 124 of the site 108, the MSD 116 can identify the media server 126 of the site 108 as the preferred media server 126 for the user endpoint device 104 due to its registration with the SBC 124 and thus arrange for any video content associated with the DVR functionality for the subscriber of the user endpoint device 104 to be stored in the media server 126 for later access by the user endpoint device 104, thereby reducing latency and reducing the number of network links between the user endpoint device 104 and the source of the multimedia content. To illustrate, in the event that the user endpoint device 104 is re-registered to another site, the MSD 116 can provide the information to the provisioning interface so as to permit the service provisioning system for the network DVR service can decide to transfer all stored data to the new site. The MSD 116 can be implemented as one or more servers or other computer systems configured to execute one or more sets of executable instructions to carry out the functionality ascribed to the MSD 116 described herein, an example of which is described in detail below with reference to FIG. 6.

Figure 2:
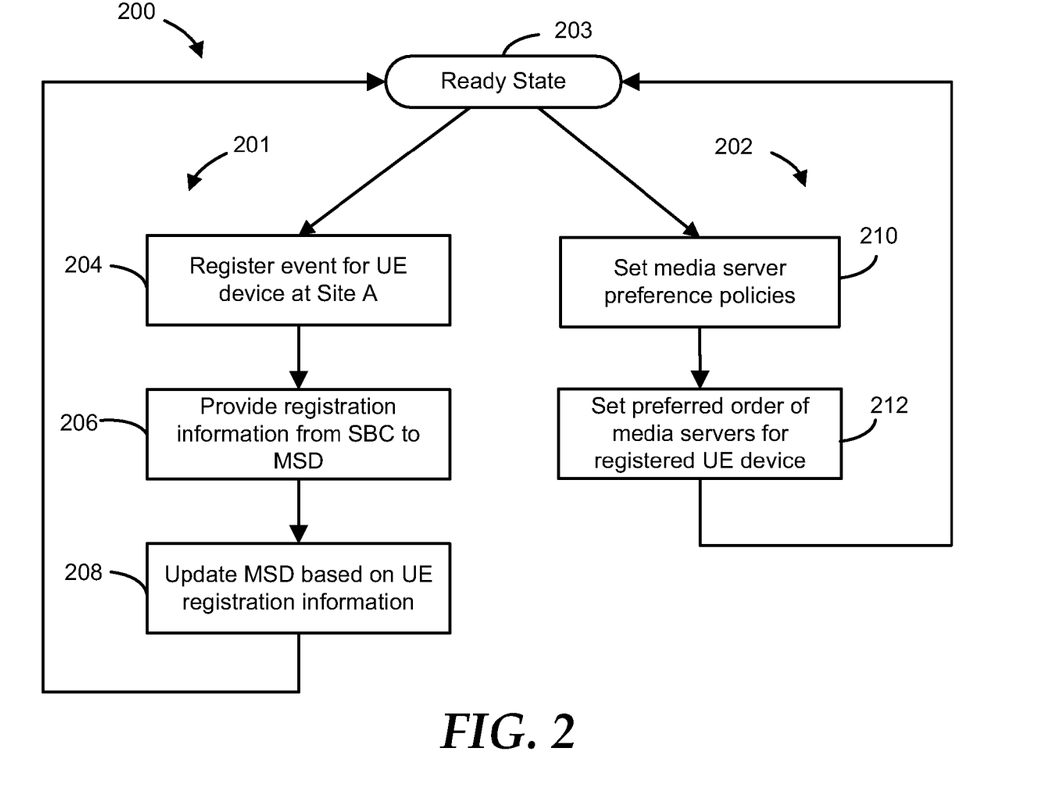
FIG. 2 is a flow diagram illustrating an example method for configuring a provider network to support facilitating a media flow within the telecommunication system of FIG. 1 in accordance with at least one embodiment of the present disclosure.
Figure 3:
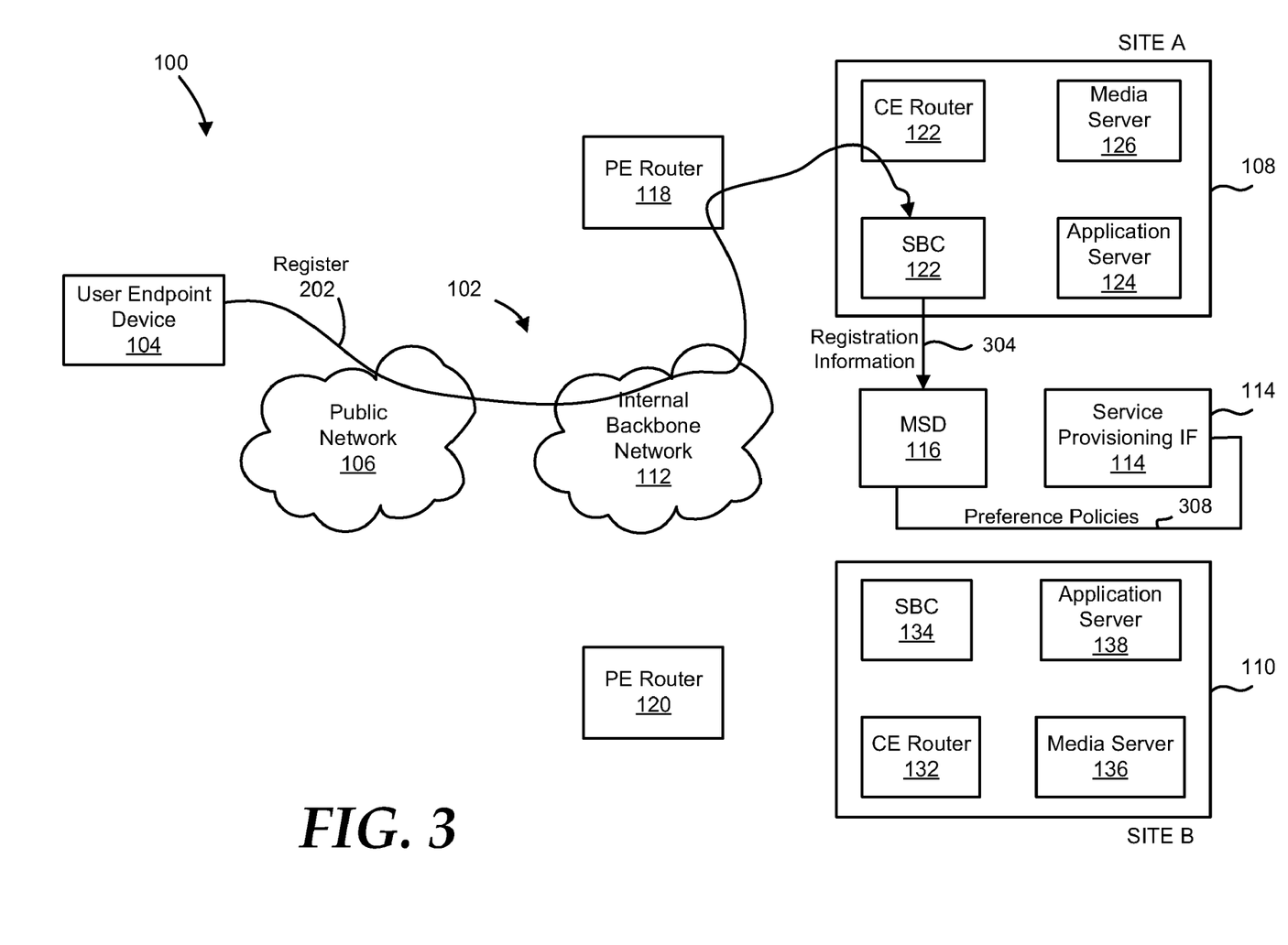
FIG. 3 is a diagram illustrating information transmission in the telecommunication system of FIG. 1 with reference to the method of FIG. 2 in accordance with at least one embodiment of the present disclosure.

FIG. 2 illustrates an example method 200 of configuring the telecommunication system 100 of FIG. 1 to facilitate optimized media flows and FIG. 3 illustrates the flow of information within the telecommunication system 100 with respect to method 200 in accordance with at least one embodiment of the present disclosure. The method 200 includes two independent flows, registration flow 201 and media sever ordering flow 202. Each of these flows is initiated by a respective event, whereby the state of the telecommunications network 100 at the time of the event is illustrated via block 203. The registration flow 201 can be implemented for each registration event for each user endpoint devices of the telecommunications system 100. The media server ordering flow 202 can be implemented for each site/SBC of the provider network 102, whereby the ordering flow 202 can be repeated periodically for each site/SBC so as to update the preference order based on changing network/utilization conditions.

The registration flow 201 initiates at block 204 with a registration event with a user endpoint device (e.g., user endpoint device 104, FIG. 1) of the telecommunications system 100. This registration event can include the user endpoint device successfully registering (register line 302, FIG. 3) with a SBC (e.g., SBC 124) located in a particular site (site 108 or "site A" in this example).

To illustrate, the particular site for a user endpoint device can be determined based on geographical proximity (e.g., the users in a particular city register with the central office for that city). Alternately, the particular site can be determined based on class of services afforded to the user endpoint device, based on network connection type between the user endpoint device and the provider network 102, and the like. Alternately, the registration event can include the user endpoint device 104 deregistering with the SBC 124 or the current registration may expire due to the device going offline.

At block 206, the SBC 124 forwards registration information 304 (FIG. 3) to the MSD 116 in response to the registration/deregistration of the user endpoint device with the site 108. The registration information 304 can include, for example, an identifier associated with the user endpoint device 104 and an identifier associated with the SBC 124 or the site 108. Similarly, the current workload information for the media servers of a site can be periodically provided to the MSD 116. The MSD 116 can support, for example, a Diameter interface or a SIP interface to receive this information from the SBC 124 and the media server 126.

At block 208, the MSD 116 updates its datastore to reflect the relationship between the user endpoint device and the site 108. The datastore of the MSD 116 can be a local persistent storage medium (e.g., non-volatile memory or a hard disk), or the datastore can include a remote database or server (e.g., a service provisioning system). In the case of a deregistration of the user endpoint device 104, this update can include, for example, removing the indication of the user endpoint device registering with the SBC 124.

It will be appreciated that the deregistration of the user endpoint device does not necessarily affect the operation of the provider network 102, accordingly, rather than notifying the MSD 116 whenever a user endpoint device re-registers, the SBC of a site instead can be configured to notify the MSD 116 only when a user endpoint device initially registers with the SBC or reregisters with the SBC after a certain time period has elapsed since the previous notification, thereby lowering performance overhead in the recognition that many user endpoint devices are not highly mobile and thus typically remain registered with the same site.

As discussed below, the MSD 116 utilizes the registration of the user endpoint device with the site 108 to select a media server to support media sessions with the user endpoint device. This process is described in greater detail below with reference to FIGS. 4 and 5.

The media sever ordering flow 202 initiates in response to a network operator or other entity configures one or more preference policies (preference policies 308, FIG. 5) for generating a preference order of media servers for a site/SBC for supporting user endpoint devices registered with the site/SBC at block 210. In one embodiment, the configuration of preference policies is accomplished via the provisioning system interface 114. The preference policies can include, for example, prioritization based on location, prioritization based on workload, and the like.

To illustrate, the use of a media server collocated at the same site as the corresponding SBC provides for more efficient media session with the user endpoint devices registered with the SBC because fewer network link traversals within the provider network 102 are necessary for the media session, thereby avoiding the "hairpin" problem resulting from the use of a media server at a different site. However, in certain instances, duplicate use of the same network link for a media session by using a media server at a different site may be acceptable if it avoids overloading the media server at the same site. Accordingly, the preference policies can implement a balancing between network utilization efficiency and media server utilization efficiency.

By way of example, the preference policies can be implemented as a weighted scoring operation whereby each media server is given a score based on its particular location with respect to the registered site and another score based on its particular workload. In this instance, the particular suitability of any given media server for supporting a media session with the user endpoint device can be determined based on a weighted sum of the two scores assigned to the media server. As another example, the preference policies can be implemented such that any media server collocated at the registered site is automatically preferred unless it is unavailable, in which case a backup media server is selected from another site based on load balancing considerations. As yet another example, the MSD 116 can poll the network link utilization information from the CE routers and the PE routers of the provider network 102 and weigh the PE-CE link utilization and the media server workload to decide which media server should be used for a media session involving a user endpoint device registered in the site.

Using the registration information 304 (FIG. 3) indicating the registration of one or more user endpoint devices with the SBC 124 of the site 108 (block 204), together with the policy defined by network operator on how to select media servers based on their locations relative to SBC and the media servers' workloads, at block 212 the MSD 116 selects a preference order of media servers in the provider network 102 for user endpoint devices associated with a given SBC, such as user endpoint device 104. The preferred order is determined based on the preference policies 308 (FIG. 3) set by the network operator. As discussed above, it typically is advantageous to utilize a media server collocated at the registered site to support a media session with the registered user endpoint device, and thus the media server collocated at the same site will have a higher preference in the preference order than media servers located at other sites. Likewise, media servers having a lower current workload may have a higher preference in the preference order than media servers with higher current workloads. The preference order can be stored at the MSD 116 in the form of a table, list, or other data structure. In one embodiment, the preference order can be implemented as two tables: one table indicating the preferred and secondary media servers for a given SBC, and the second table indicating the SBC to which a user endpoint is currently registered.

Figure 4:
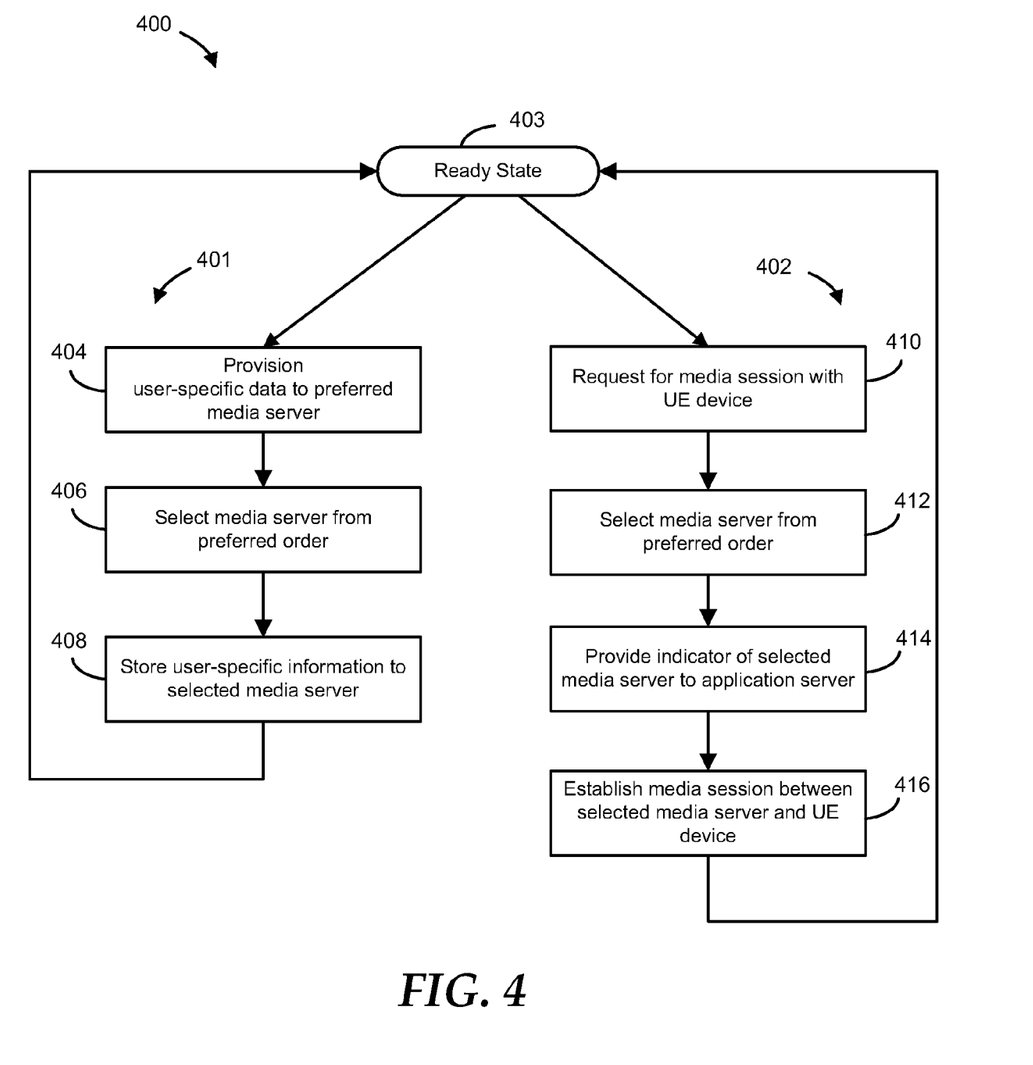
FIG. 4 is a flow diagram illustrating an example method for facilitating media flow within the telecommunication system of FIG. 1 using enhanced media server assignment in accordance with at least one embodiment of the present disclosure.
Figure 5:
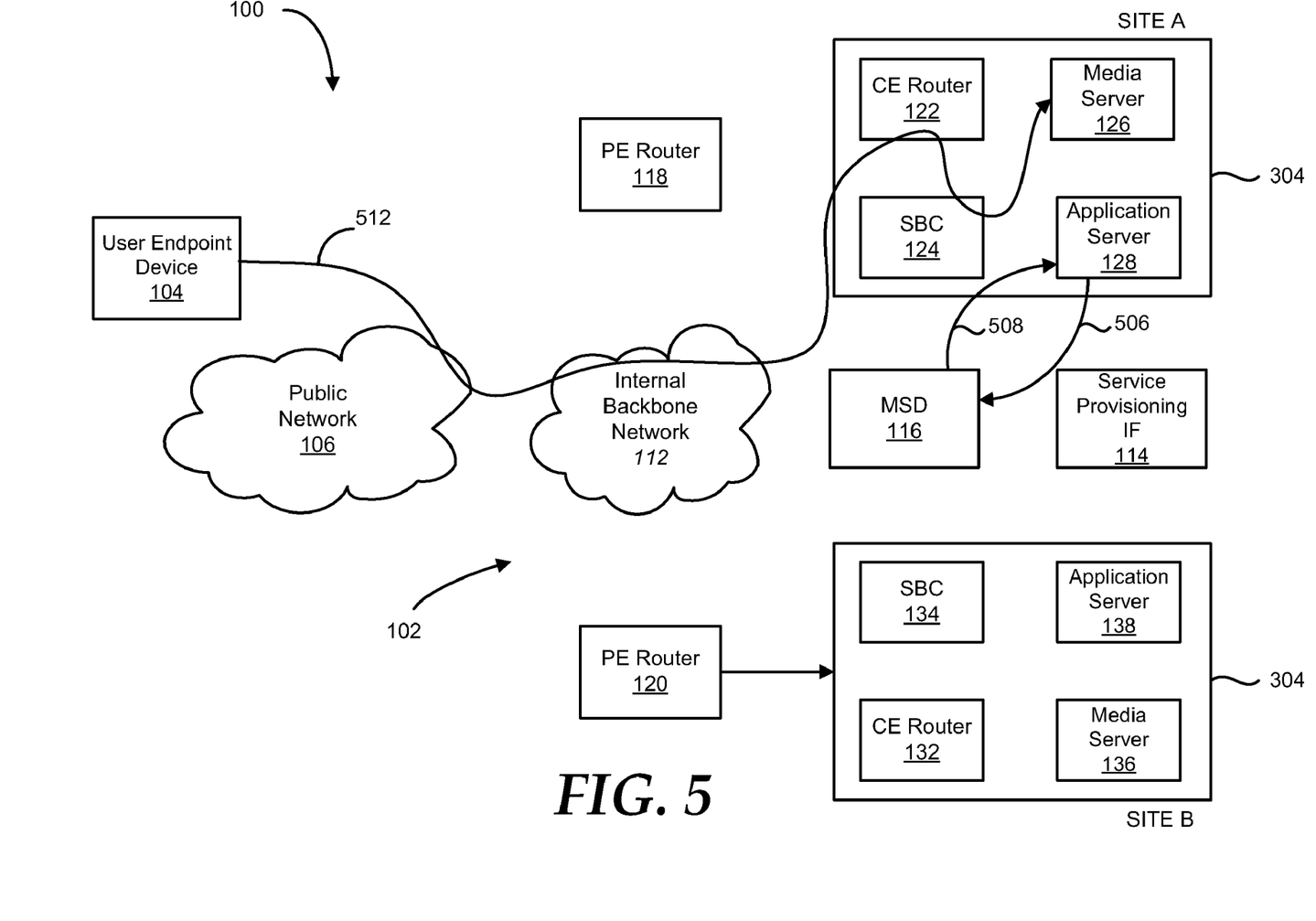
FIG. 5 is a diagram illustrating information transmission in the telecommunication system of FIG. 1 with reference to the method of FIG. 4 in accordance with at least one embodiment of the present disclosure.

FIG. 4 illustrates a method 400 for optimized media flow within the telecommunication system 100 of FIG. 1 using enhanced media server assignment and FIG. 5 illustrates the flow of information within the telecommunication system 100 with respect to the method 400 in accordance with at least one embodiment of the present disclosure. The method 400 includes two independent flows, media server provision flow 401 and media session flow 402. Each of these flows is initiated by a respective event, whereby the state of the telecommunications network 100 at the time of the event is illustrated via block 403. The flow 401 can be implemented for some or all user endpoint devices registered with a particular site. The flow 402 can be implemented for each media session initiation event for the user endpoint devices registered with the particular site.

The media server provision flow 401 is initiated in response to the MSD 116 determining whether there is any user-specific multimedia data that can be provisioned to the preferred media server in anticipation of subsequent media sessions initiated by a user endpoint device (e.g., user endpoint device 104) or an the application server at block 404. This user-specific multimedia data can include, for example, stored video content from one or more television programs in conjunction with a networked DVR service, ringback tone content, stored multimedia messaging service content, and the like. In the event that there is multimedia data to be provisioned, at block 406 the MSD 116 selects a media server of the provider network 102 based on the preference order determined at block 212 of method 200 (FIG. 2). Typically, this selection process includes identifying the SBC to which the user endpoint device is registered and selecting the most preferred media server identified in the preference order (e.g., the media server collocated at the same site) for the SBC. However, in certain instances the most preferred media server may be unavailable, such as when the media server is offline or with a workload above a certain threshold, or when a site does not have a local media server. In such circumstances, the MSD 116 selects a backup media server based on the preference order. The backup media server can include, for example, another media server at the same site or a media server at a nearby (network latency-wise or network link-wise) site. For purposes of the following, it is assumed that the media server 126 at site 108 is the most preferred media server based on the preference order and is available, and thus the media server 126 is the selected media server.

After selecting a media server and verifying the selected media server is available, at block 408 the MSD 116 indicates (via the provisioning interface 114) to the responsible service provisioning system the preferred media server for storing the subscriber specific data. The service provisioning system can facilitate the storage of the user-specific multimedia data at the selected media server using any of a variety of provisioning processes for provisioning the multimedia data for supporting the services for the specific subscriber. The service provisioning system can further implement processes to transfer the data from another media server (e.g., media server 136) to the selected media server 126 if the information from the MSD 116 indicates the end user device has moved from one site to another site.

The media session flow 402 is initiated when an application server (e.g., application server 128) signals an intent to establish a media session with a user endpoint device of a particular site (e.g., user endpoint device 104 for site 108) for one or more media services at block 410. In one embodiment, the application server signals this intent by querying the MSD 116 with a request 506 (FIG. 5) for a media session with the user endpoint device. In response to the request 506, the MSD 116 identifies the media server selected for the particular SBC/site based on the preference order at block 412 using the same considerations described above, unless the media server was already selected by the process represented at block 406. At block 414, the MSD 116 responds to the query from the application server with an indicator of the selected media server (indicator 508, FIG. 5). The indicator can include, for example, an IP address, fully qualified domain name, or URI, or media access control (MAC) address, or other identifier of the selected media server (media server 126 in this example). At block 416, the application server signals to the selected media server 126 (signal 510, FIG. 5) to establish a media session (media session 512, FIG. 5) between the selected media server 126 and the user endpoint device 104. Media flows in support of one or more media-based applications implemented by the application server then can be conducted between the media server 126 and the user endpoint device via the established media session 512 via the SBC 124, the CE router 122, the PE router 118, the internal backbone network 112 and the linking network 106.

The media session 512 of FIG. 5 illustrates how the selection of the media server based on the site to which the user endpoint device 104 is registered can avoid duplicative network traffic and thus facilitate expansion of the transmission network 100. As illustrated by the media session 512, the selection of the media server 126 that is collocated with the SBC 124 requires traversal of the link between the PE router 118 and the CE router 122 only once in a particular direction. In contrast, assignment of the media server 136 to support a media session with the user endpoint device 104, as is likely under the conventional ad hoc approach, would result in a media session that traverses the network link between the PE router 118 and the CE router 122 two times for a particular direction. In addition, the same media session would have to traverse between the PE router 120 and the CE router 132 one more time. This three-time traversal results when the media flow traverses from the user endpoint device to the PE router 118, and then to the CE router 122 and subsequently the SBC 124. However, because the media server 136 is at a different site accessible only via the internal backbone network 112, the SBC 124 then must turn the media flow back around through the CE router 122 to the PE router 118, and on through to the media server 136 at site 110 via the PE router 120, and the CE router 132. This redirection between multiple sites caused by conventional media server assignment processes results in duplicate use of the same network link, as well as excessive network hops, thereby increasing the latency in the media flow.

Figure 6:
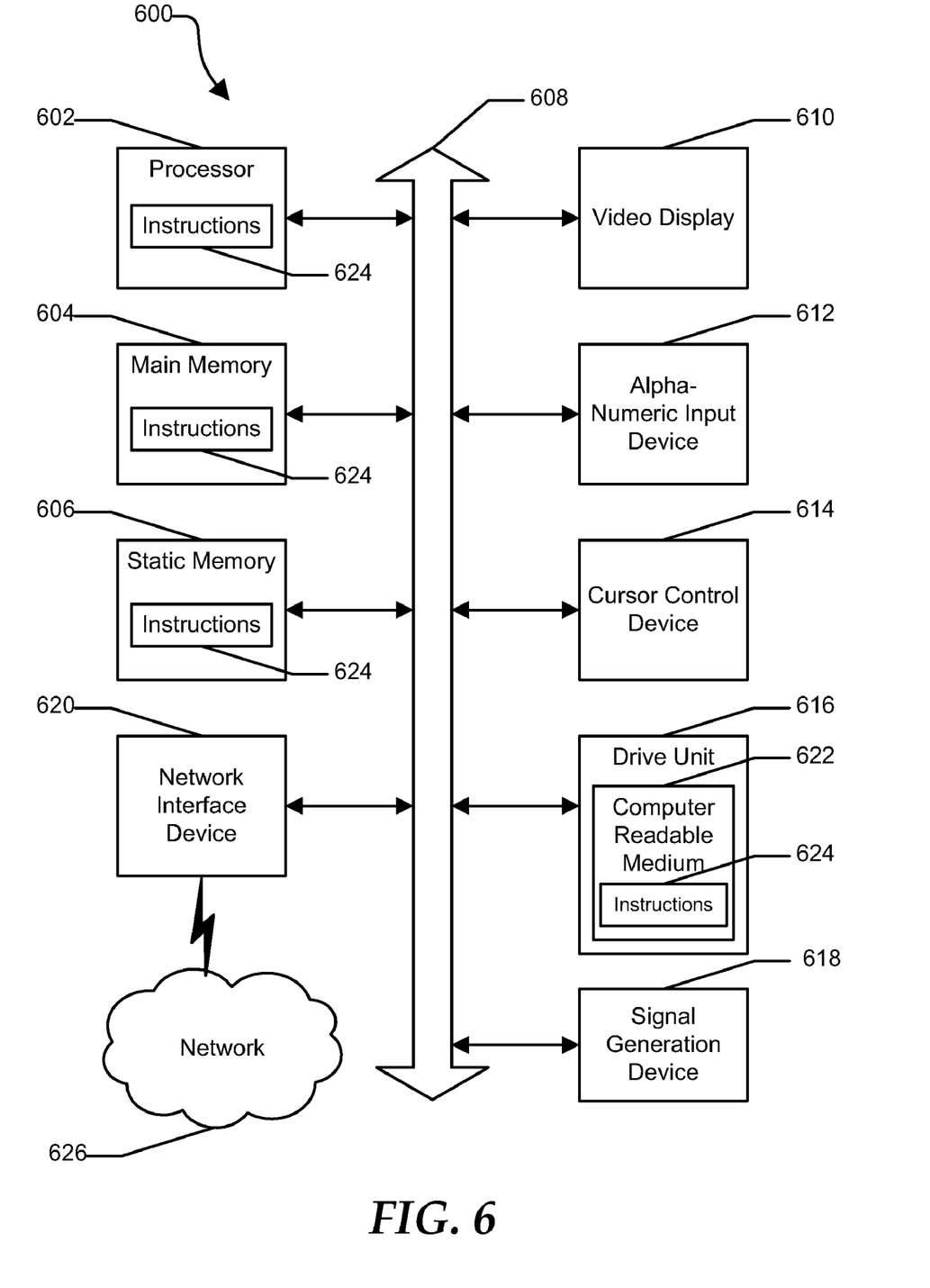
FIG. 6 is a diagram illustrating an example computer system for implementing one or more of the techniques described herein in accordance with at least one embodiment of the present disclosure.

FIG. 6 illustrates a general computer system 600 in accordance with at least one embodiment of the present disclosure. The computer system 600 can include a set of instructions that can be executed to cause the computer system 600 to perform any one or more of the methods or computer-based functions disclosed herein, such as those described above with respect to the media server director (MSD) 116 of FIG. 1. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into, for example, a STB device. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, e.g., a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

What is claimed is:

1. In a telecommunication system comprising a provider network having a plurality of sites, a method comprising:
   receiving, at a media server director of the provider network, at least one preference policy for selecting media servers to provide services to user endpoint devices;
   receiving, at the media server director of the provider network, registration information from a session border controller located at a select site of the plurality of sites, the registration information indicating that a user endpoint device has registered with the session border controller;
   determining, at the media server director, a preference order for media servers of the provider network for the session border controller based on the at least one preference policy and at least in part on the registration information;
   selecting, at the media server director, a media server of the provider network based on the preference order responsive to a request to establish a media session with the user endpoint device from an application server; and
   facilitating connection of the media session between the selected media server and the user endpoint device.

2. The method of claim 1, wherein the at least one preference policy comprises at least one of: a preference for a media server collocated with the session border controller at the select site over media servers located at other sites of the plurality of sites; a preference for a media server having a lighter workload over media servers having a heavier workload; and a preference for a media server that would result in the media session utilizing a network link with a lighter load over media servers that would result in the media session utilizing a network link with a heavier load.

3. The method of claim 1, wherein the selected media server comprises the highest ranked media server of the preference order.

4. The method of claim 1, wherein selecting the media server comprises selecting a lower ranked media server in the preference order as the select media server responsive to determining a higher ranked media server in the preference order is unavailable.

5. The method of claim 1, wherein facilitating connection of the media session comprises providing an identifier of the selected media server to the application server.

6. The method of claim 1, further comprising:
   storing user-specific multimedia content at the selected media server responsive to selecting the select media server.

7. The method of claim 1, wherein the telecommunication system comprises a packet-based transport network configured to support media sessions based on at least one of Voice over Internet Protocol (VoIP) or Multimedia over Internet Protocol (MoIP).

8. The method of claim 1, wherein the media session is to convey multimedia content to a user at the user endpoint device, the multimedia content comprising at least one of: a ringback tone; a multimedia messaging service; and a packet-based conference call.

9. In a telecommunication system comprising a provider network comprising a plurality of sites, a provider network comprising:
   a media server director coupled to each of the plurality of sites, the media server director configured to:
      receive a preference policy for selecting media servers to provide services to user endpoint devices;
      receive registration information from a session border controller located at a select site of the plurality of sites, wherein the registration information indicates a user endpoint device has registered with the session border controller;
      determine a preference order for media servers of the provider network for the session border controller based on the preference policy and at least in part on the registration information;
      receive a request to establish a media session with the user endpoint device from an application server;
      select a media server of the provider network based on the preference order responsive to the request to establish the media session; and
      facilitate connection of the media session between the selected media server and the user endpoint device.

10. The provider network of claim 9, wherein the media server director is configured to determine the preference order for media servers based on at least the preference policy, the at least one preference policy comprising at least one of: a preference for a media server collocated with the session border controller at the select site over media servers located at other sites of the plurality of sites; a preference for a media server having a lighter workload over media servers having a heavier workload; and a preference for a media server that would result in the media session utilizing a network link with a lighter load over media servers that would result in the media session utilizing a network link with a heavier load.

11. The provider network of claim 9, wherein the selected media server comprises the highest ranked media server of the preference order.

12. The provider network of claim 9, wherein the media server director is configured to select a lower ranked media server in the preference order as the selected media server responsive to determining a higher ranked media server in the preference order is unavailable.

13. The provider network of claim 9, wherein the media server director is configured to facilitate connection of the media session by providing an identifier of the selected media server to the application server.

14. The provider network of claim 9, further comprising:
a packet-based transport network coupling at least a subset of the plurality of sites, the packet-based transport network configured to support media sessions based on at least one of Voice over Internet Protocol (VoIP) or Multimedia over Internet Protocol (MoIP).

15. The provider network of claim 9, wherein the media session conveys multimedia content to a user at the user endpoint device, the multimedia content comprising at least one of: a ringback tone; a multimedia messaging service; and an ad hoc conference call.

16. A computer readable medium embodying a set of executable instructions, the set of executable instructions comprising executable instructions configured to manipulate at least one processor to:
receive a preference policy for selecting media servers to provide services to user endpoint devices;
receive registration information from a session border controller located at a select site of a plurality of sites of a provider network, the registration information indicating that a user endpoint device has registered with the session border controller;
determine a preference order for media servers of the provider network for the session border controller based on the preference policy and at least in part on the registration information;
select a media server of the provider network based on the preference order responsive to a request to establish a media session with the user endpoint device from an application server; and
facilitate connection of the media session between the media server and the user endpoint device.

17. The computer readable medium of claim 16, wherein the executable instructions configured to manipulate the at least one processor to determine the preference order for media servers comprise executable instructions configured to manipulate the at least one processor to determine the preference order based on at least one preference policy defined by a network operator of the provider network, the at least the preference policy comprising at least one of: a preference for a media server collocated with the session border controller at the select site over media servers located at other sites of the plurality of sites; a preference for a media server having a lighter workload over media servers having a heavier workload; and a preference for a media server that would result in the media session utilizing a network link with a lighter load over media servers that would result in the media session utilizing a network link with a heavier load.

18. The computer readable medium of claim 16, wherein the executable instructions configured to manipulate the at least one processor to select the media server comprise executable instructions configured to manipulate the at least one processor to select a lower ranked media server in the preference order as the media server responsive to determining a higher ranked media server in the preference order is unavailable.

19. The computer readable medium of claim 16, wherein the executable instructions configured to manipulate the at least one processor to facilitate connection of the media session comprise executable instructions configured to manipulate the at least one processor to provide an identifier of the media server to the application server.

20. The computer readable medium of claim 16, wherein the provider network comprises a packet-based transport network coupled to at least a subset of the plurality of sites and configured to support media sessions based on at least one of Voice over Internet Protocol (VoID) or Multimedia over Internet Protocol (MoIP).

21. The computer readable medium of claim 16, wherein the media session is to convey multimedia content to a user at the user endpoint device, the multimedia content comprising at least one of: a ringback tone; a multimedia messaging service; and an ad hoc conference call.

* * * * *